June 6, 1967 — E. B. BURNETT — 3,323,779
OVERHEAD HOIST AND BRAKE THEREFOR
Filed Sept. 13, 1965 — 2 Sheets-Sheet 1

INVENTOR.
ELMER B. BURNETT
BY David W. Tillott
ATTORNEY

June 6, 1967  E. B. BURNETT  3,323,779

OVERHEAD HOIST AND BRAKE THEREFOR

Filed Sept. 13, 1965  2 Sheets-Sheet 2

INVENTOR.
*ELMER B. BURNETT*
BY
David W. Tilton
ATTORNEY

10 # United States Patent Office 3,323,779
Patented June 6, 1967

3,323,779
OVERHEAD HOIST AND BRAKE THEREFOR
Elmer B. Burnett, Monroeton, Pa., assignor to Ingersoll-Rand Company, New York, N.Y., a corporation of New Jersey
Filed Sept. 13, 1965, Ser. No. 486,829
6 Claims. (Cl. 254—168)

This invention relates generally to overhead hoists and more particular to brakes therefor.

The incorporation of brakes in overhead hoists to prevent slippage while loaded is not in itself new. However, conventional hoist brakes require relatively high drive shaft torque for unlocking, thereby creating a tendancy for the unbraked hoist mechanism and load to jump when the brake releases. This condition subjects the hoist and load to shock stresses. Even more important, however, is the loss of creep or fine control of the hoist required for precision positioning of the load.

Accordingly, an object of the present invention is to provide an overhead hoist with an improved load responsive brake.

Another object of the present invention is to provide an overhead hoist with a load responsive brake embodying friction reducing means for low torque release to provide creep control or precision load positioning capabilities.

Another object of the present invention is to provide an overhead hoist with brake means to prevent a hanging load from dropping, and having low torque quick release means when the hanging load is to be further positioned.

And still, another object of the present invention is to provide an overhead hoist with a planetary gear power transmission having means for load distribution.

The present invention contemplates an overhead hoist comprising a power transmission housing, a planetary gear system disposed in the housing connected at one end to a power input means and having a gear connected to a load supporting means, a brake means disposed in the housing to prevent an elevated load from dropping when the hoist is at rest, a ring gear disposed in the housing in mesh with the planetary gears and rotated through a limited distance by the load while the hoist is at rest, and means for causing the ring gear to operate the brake means in response to limited rotation of the ring gear to frictionally lock the gear connected to the load to the housing.

Figure 1:
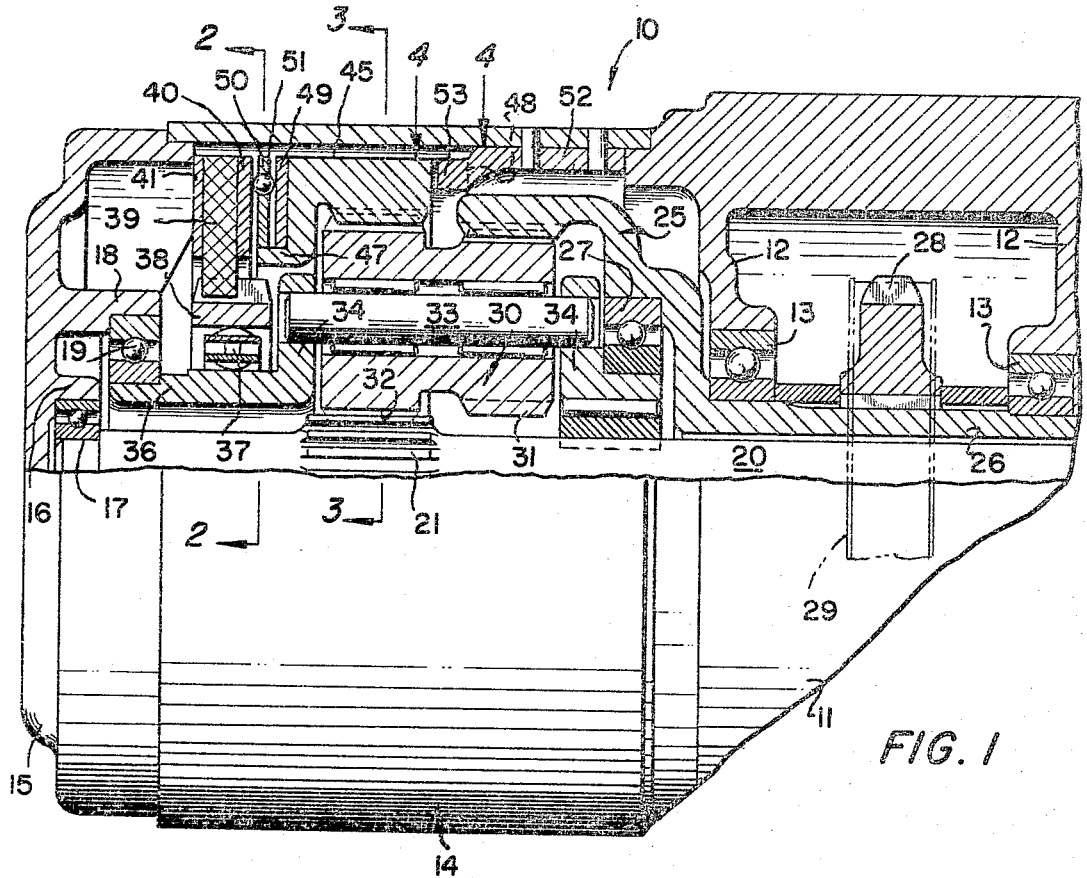
Figure 4:
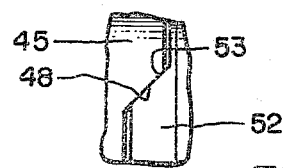
Figure 5:
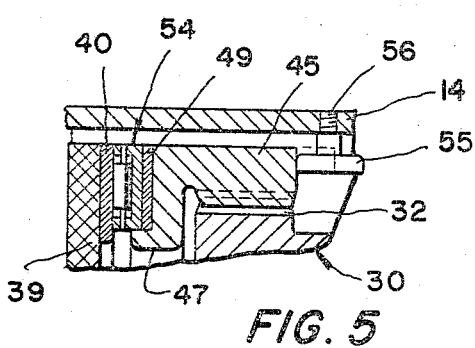
Figure 2:
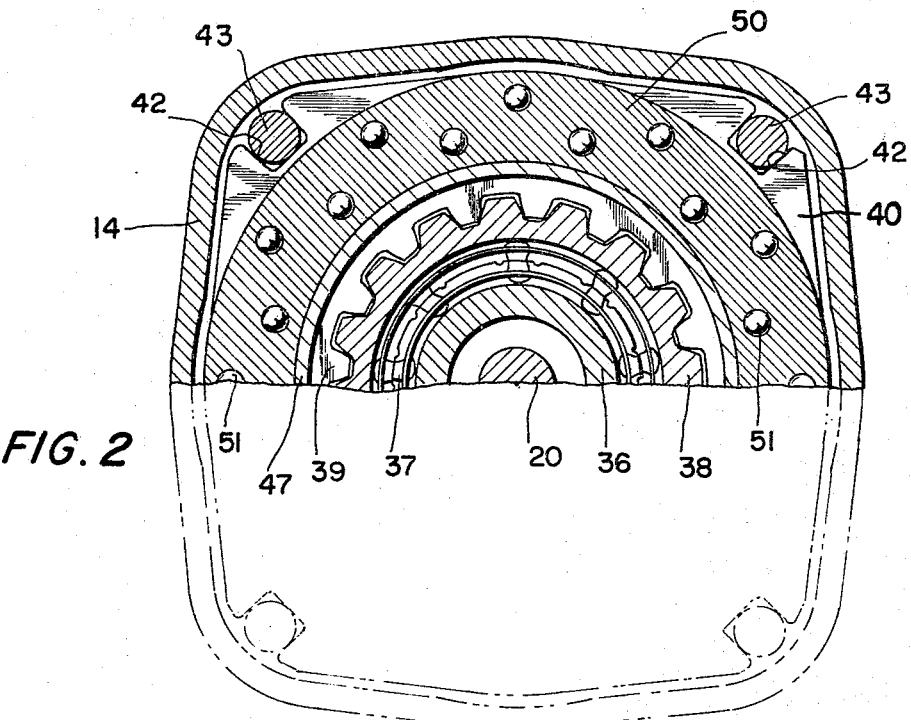
Figure 3:
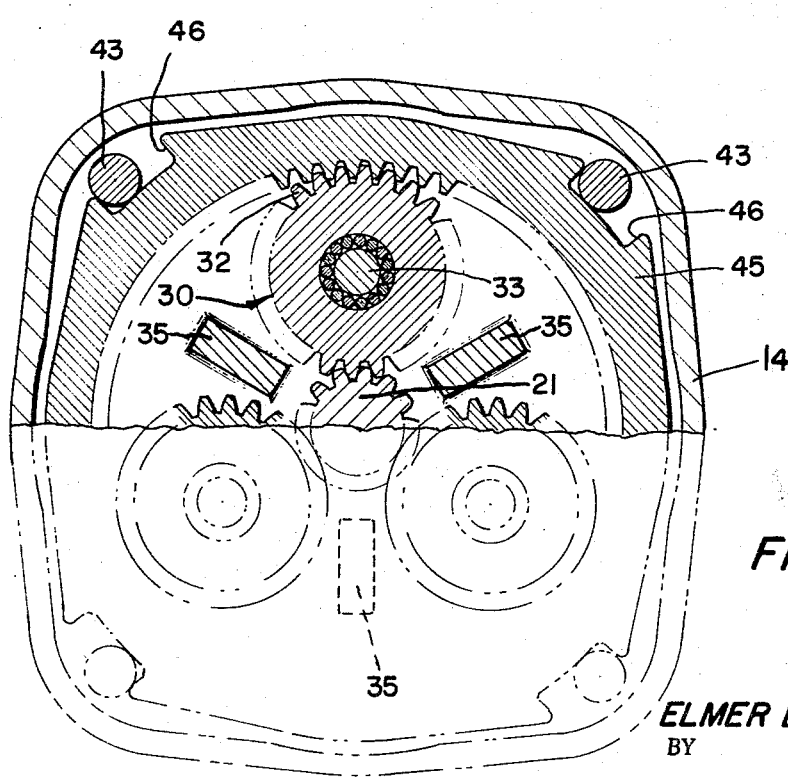

The invention is described in connection with the accompanying drawings wherein:

FIG. 1 is a front elevational view, partly in section, of a portion of an overhead hoist made in accordance with the present invention;

FIGS. 2 and 3 are sectional end views taken on lines 2—2 and 3—3, respectively, of FIG. 1;

FIG. 4 is a plan view of cooperating cam surfaces taken on line 4—4 of FIG. 1; and FIG. 5 is a fragmentary sectional view similar to part of FIG. 1 illustrating modified cam and friction reducing embodiments.

Referring now to the drawings, the drive and brake end of an overhead hoist has a power transmission housing 10, as shown in FIG. 1, comprised of a sprocket casing 11 connected at one end to a casing cylinder 14 by any conventional means (not shown). An end cap or cover 15 is connected by conventional means (not shown) to the other end of cylinder 14 remote from casing 11.

Casing 11 has a pair of axially spaced, inwardly extending annular flanges or carriers 12 each supporting a bearing 13, which will be further discussed. Cover 15 has a pair of spaced and concentric, axially extending annular flanges or carriers 16 and 18 which support bearings 17 and 19, respectively.

A power or drive shaft 20 extends through the housing 10 with its end disposed in the cover 15 and rotatably carried by bearing 17. The other end of shaft 20 is adapted to be connected to drive means (not shown). Shaft 20 has straight splines or a pinion 21 which, as shown, is provided by axial fluting on the shaft. It should be understood, however, pinion 21 could be a ring gear fixed on the shaft 20.

An internally toothed output ring gear 25 of cup-like form is disposed in the housing 10 and has a tubular shaft portion 26, encircling a portion of shaft 20, which is rotatably mounted in bearings 13. A bearing 27 is housed in the gear 25 while a sprocket 28 is keyed or otherwise fixed to shaft portion 26 between bearings 13. A conventional load chain 29 meshes with sprocket 28; its load supporting length being varied by rotation of the drive gear 25 which turns sprocket 28.

A planetary cage or frame 34 surrounds the shaft 20 and is rotatably mounted in the bearings 19 and 27. The cage 34 is composed of a pair of axially spaced end hubs, also designated 34, and three webs 35 running between and interconnecting the hubs 34. The hubs 34 are further interconnected by three angularly spaced planetary gear shafts 33, each located between an adjacent pair of the webs 35.

A cluster of planetary gears 30 encircle shaft 20, each being rotatable on a shaft 33. While the cluster is shown and described as comprising three gears 30, this number has been used for facility of description and is not to be construed as defining the limits of the invention. Each of the planetary gears 30 have axial splines or a toothed gear face 31 in mesh with ring gear 25, and axial splines or a toothed gear face 32 in mesh with shaft portion 21.

A toothed or carrier ring 38 encircles the left-hand hub 34, shown in FIG. 1, and is connected thereto for rotation in only one direction with the cage 34 by an annular unidirectional clutch 37 mounted on the hub 34. The direction of rotation in which the clutch 37 is locked will depend on the rotary direction of the torque applied to the cage 34 by a load when the hoist is at rest. This will be understood from the description of the operation of the invention. A friction ring 39, disposed between a pair of brake or friction rings 40 and 41, encircles and is carried by ring 38. Friction ring 39 is permitted to move axially on carrier ring 38 but no relative rotation therebetween is provided.

Brake rings 40 and 41 are of the same shape, each having four peripheral slots 42, as shown in FIG. 2, the slots of ring 41 not being shown as they coincide with the slots of ring 40. Rings 40 and 41 are held against rotation by four dowels 43 that are fixed in the housing 10 and pass through slots 42 in both rings. Rings 40 and 41 are free, however, to move axially on dowels 43.

An internally toothed ring gear 45 is disposed in casing cylinder 14 and meshes with the gear faces 32 of planetary gears 30 that also are in mesh with shaft pinion 21. Ring gear 45 has four peripheral slots 46 alined with and wider than slots 42, as shown in FIG. 3. Dowels 43 pass through and normally abut one side of the slots 46. Thus, ring gear 45 is permitted axial movement on dowels 43, and limited rotation movement in accordance with the relative difference between the diameters of the dowels 43 and the widths of slots 46.

Ring gear 45 has an axially extending annular flange 47 at one end that carries a race 49, and a ring 50 with a plurality of ball bearings 51 between the race 49 and brake ring 40. Thus brake ring 40 also acts as a ball race and pressure plate. The other end of ring gear 45 is provided with a plurality of cam surfaces 48 (only one shown in the drawings), as shown in FIG. 4.

Cam surfaces 48 engage and cooperate with cam surfaces 53 (only one shown in drawings) of a cam ring 52 fixed immovably to casing cylinder 14. It should be understood that ring 52 may be a plurality of fixed cam members to provide surfaces 53.

As shown in FIG. 5, a needle bearing assembly 54 may be provided in place of the ball bearing assembly 50, 51. Cam ring 52, also shown in FIG. 5, may be replaced by a plurality of rollers 55 each connected to casing cylinder 11 by studs 56.

*Operation*

In the following description of hoist operation clockwise and counterclockwise rotation sets forth direction of rotation of parts when viewed as in FIGS. 2 and 3. Prior to discussing operation, it should be understood that gear faces 32 of planetary gears 30 are greater than the diameters of gear faces 31. Similarly, the diameter of ring gear 45 in mesh with gear faces 32 is of larger diameter than the diameter of drive gear 25 in mesh with gear face 31. Thus rotation of gears 30 by drive shaft 20 will cause greater relative rotation between ring gear 45 and the cage 34 than between ring gear 25 and the cage 34; the difference therebetween causing ring gear 25 to rotate at a slower rate and in the same direction as the cage 34 and drive shaft 20.

When drive shaft 20 is held against rotation by motor means (not shown) and chain 29 is supporting a load (not shown) the load weight on the chain acts through sprocket 28 to urge ring gear 25 to rotate in a counterclockwise direction which, in turn, through the cluster of planetary gears 30 urges ring gear 45 to rotate counterclockwise on pins 43, looking at FIG. 3. Cam surfaces 48 and 53 coact to urge ring gear 45 axially toward cover 15 simultaneously with counterclockwise rotation thus exerting a braking force through bearings 51 to clamp friction ring 39 against rotation between the nonrotatable brake rings 40 and 41. At the same time the unidirectional clutch 37 locks the cage 34 to the friction ring 39 preventing the cage 34 from rotating in a counterclockwise direction.

In this braked condition, to raise the load power is provided to rotate drive shaft 20 clockwise causing clockwise rotation of the cage 34 and drive gear 25. The cage 34 is permitted clockwise rotation, while friction ring 39 is held stationary by brake rings 40 and 41, by the unidirectional clutch 37 which opens in a clockwise direction and has low torque requirements for release.

Similarly when friction ring 39 is locked and the load is to be lowered, power is provided to rotate drive shaft 20 counterclockwise causing gears 30 to rotate counterclockwise on their shafts 33 to initially urge ring gear 45 to rotate clockwise until pins 43 abut the sides of slots 46. Clockwise rotation of ring gear 45 cancels the braking force that was transmitted by bearings 51 releasing friction ring 39 for rotation with the cage 34. Counterclockwise rotation of gears 30 on their shafts 33, as previously discussed, causes counterclockwise rotation of the cage 34 and of drive gear 25 at a slower rate. Since the brake rings 40 and 41 are open, the cage 34 can rotate in a counterclockwise direction even though the unidirectional clutch 37 is locked.

It will now be understood that by inclusion of low friction means such as ball bearings 51 and the unidirectional clutch 37 of FIG. 1, and needle bearing assembly 54 and cam roller 55 of FIG. 5 provides a quick release brake having low torque release requirements in an overhead hoist.

Although two embodiments of the invention have been illustrated and described, it should be understood that the invention is not limited thereto and that various changes may be made in the design and arrangement of the parts without departing from the spirit and scope of the invention.

Having described my invention, I claim:

1. In an overhead hoist having a power transmission housing and means disposed in the housing and extending therefrom for raising and lowering a load and supporting an elevated load, a power transmission and brake mechanism comprising:
    a planetary gear system disposed in the housing and having a power input gear adapted to be rotatably driven, a power output gear connected to the load supporting means for raising a load when rotated in one direction and for lowering a load when rotated in the opposite direction, and planetary gear means interconnecting the power input and output gears for providing a driving connection therebetween;
    brake means disposed in the housing and having friction means movable axially into and out of frictional engagement with one another;
    one of the friction means being connected against rotation to the housing and the other friction means being connected to the planetary gear system for rotation relative to said one of the friction means when the power output gear rotates in a direction to lower a load;
    brake gear means disposed in the housing for limited rotation between a first and second position, and having cam means operable in response to the limited rotation for axial movement of the brake gear means away from said brake means to permit rotation of said other friction means when the brake gear means is rotated to its first position and for causing the brake gear means to move axially toward the brake means for moving the friction means into engagement with each other to hold the output gear from rotation when the brake gear means is rotated away from its first position and toward its second position;
    the brake gear means being in mesh with the planetary gear means and rotated thereby toward its first position when the planetary gear means is rotated by the power input gear to lower the load and toward its second position when the power input gear is held against rotation and the power output gear is rotated by an elevated load; and
    bearing means disposed between the brake gear means and brake means for reducing friction to facilitate rotation of the brake gear means toward its first position when the friction means are in frictional engagement with each other.

2. The power transmission and brake means of claim 1, including:
    means connecting the other friction means to the planetary gear system to prevent relative rotation therebetween when the power output gear rotates in the direction to lower a load and to permit the power output gear to rotate relative to the other friction means in the direction to raise a load.

3. The power transmission and brake means of claim 1 wherein the planetary gear means comprises:
    a cage rotatably supported in the housing;
    a cluster of gear means rotatably supported on the cage; and
    each of the gear means of the cluster providing a pair of gear faces rotatable in unison and disposed axially relative to each other, one of which is in mesh with the power output gear and the other is in mesh with the power input gear and the brake gear means.

4. The power transmission and brake means of claim 3, wherein each of the gear means of the cluster comprises:
    a shaft; and
    a gear rotatably supported on the shaft and having a pair of annular series of axial splines, each series of splines being disposed axially relative to the other and forming one of the pair of rotatable gear faces.

5. In an overhead hoist having a power transmission housing with a rotatable means disposed in one end of the housing and a hoist line means engaged by the rotatable means extending downwardly from the housing for raising and lowering a load when the rotatable means is rotated and for supporting an elevated load when the rotatable means is held against rotation, the combination of a power transmission and brake means comprising:
- a power input shaft disposed axially in the housing and adapted to be rotated to provide power to the hoist for raising and lowering loads;
- a power input gear disposed in the housing and connected to the power input shaft for rotation thereby;
- a ring gear disposed in the housing co-axial with the power input gear and having a tubular shaft portion encircling and extending axially along a portion of the power input shaft;
- the rotatable means being connected to the tubular portion of the ring gear and rotated thereby for raising a load when rotated in one direction and for lowering a load when rotated in the opposite direction;
- a plurality of rotatable gear means arcuately spaced from one another each meshing with the power input and ring gears;
- rotatable frame means disposed in the housing for supporting the rotatable gear means and revolving the rotatable gear means around the power input gear and within the ring gear when the frame means rotates;
- the power input and ring gears with the meshing gear means and their frame means providing a gear train for transmitting rotational power from the power input shaft to the rotatable means;
- a pair of friction means movable axially into and out of frictional engagement with each other for providing brake means in the housing to prevent a supported load from dropping, one of the pair of friction means being fixed against rotation and the other of the pair of friction means being connected to the gear train for rotation relative to the one of the pair of friction means when the ring gear rotates in the direction for lowering a load;
- cam means fixedly disposed in the housing;
- a brake gear disposed in the housing for limited rotation and being in mesh with the rotatable gear means and rotated thereby in one direction when the ring gear rotates to lower a load with the power input gear held against rotation and in the opposite direction when the ring gear rotates to lower a load in response to rotation of the power input gear;
- the brake gear being movable axially toward and away from the brake means and having cam face means operatively associated with the cam means for moving the brake gear axially toward the brake means when it is rotated in the one direction and for permitting the brake gear to move axially away from the brake means when it is rotated in the opposite direction; and
- bearing means disposed between the brake gear and brake means for providing low friction means therebetween to facilitate rotation of the brake gear and for urging the pair of axially movable friction means into frictional engagement with each other when the brake gear moves towards the brake means.

6. The power transmission and brake means of claim 5, including:
- a unidirectional clutch disposed between the rotatable frame means and the other of the pair of axially movable friction means for connecting such friction means to each other for rotation in the direction of rotation of the frame means when the ring gear rotates to lower a load while the power input gear is held against rotation and for permitting the frame means to rotate in the opposite direction and relative to such other of the pair of axially movable friction means.

References Cited
UNITED STATES PATENTS

| | | | |
|---|---|---|---|
| 2,649,281 | 8/1953 | Hastings | 254—187 |
| 2,710,738 | 6/1955 | Wittberger | 254—186 |
| 2,800,985 | 7/1957 | Ronceray | 192—4 |
| 2,891,767 | 6/1959 | Armington | 254—186 |
| 3,244,405 | 4/1966 | Hanning | 254—186 |

MARK NEWMAN, *Primary Examiner.*

A. T. McKEON, *Assistant Examiner.*